(12) United States Patent  
Serkh et al.

(10) Patent No.: US 8,601,895 B2
(45) Date of Patent: Dec. 10, 2013

(54) FLYWHEEL HYBRID SYSTEM (75) Inventors: Alexander Serkh, Troy, MI (US); Imtiaz Ali, Lathrup Village, MI (US)

(73) Assignee: The Gates Corporation, Denver, CO (US)

( * ) Notice: Subject to any disclaimer, the term of this patent is extended or adjusted under 35 U.S.C. 154(b) by 175 days.

(21) Appl. No.: 13/248,277

(22) Filed: Sep. 29, 2011

(65) Prior Publication Data
US 2013/0081498 A1    Apr. 4, 2013

(51) Int. Cl.
*F16H 33/02* (2006.01)
*B60K 6/00* (2007.10)
*B60K 8/00* (2006.01)
*B60K 25/10* (2006.01)
*B60L 11/16* (2006.01)
*B60M 1/10* (2006.01)

(52) U.S. Cl.
USPC .......................................... 74/433.5; 180/165

(58) Field of Classification Search
USPC ....... 74/433.5, 572.1, 665 GE; 180/165, 357; 474/58–60, 72–74, 148; 123/198 R
See application file for complete search history.

(56) References Cited

U.S. PATENT DOCUMENTS

| | | | |
|---|---|---|---|
| 3,493,066 A * | 2/1970 | Dooley | 180/165 |
| 3,672,244 A | 6/1972 | Nasvytis | |
| 3,870,116 A | 3/1975 | Seliber | |
| 3,882,950 A * | 5/1975 | Strohlein | 180/165 |
| 3,949,556 A * | 4/1976 | Wallis | 60/709 |
| 4,018,052 A | 4/1977 | Laussermair | |
| 4,216,684 A | 8/1980 | Hagin et al. | |
| 4,282,947 A | 8/1981 | Kemper | |
| 4,305,488 A * | 12/1981 | McIntosh | 192/219 |
| 4,423,794 A * | 1/1984 | Beck | 180/165 |
| 4,588,040 A * | 5/1986 | Albright et al. | 180/165 |
| 4,625,823 A | 12/1986 | Frank | |
| 7,293,621 B2 | 11/2007 | Long | |
| 7,478,693 B1 | 1/2009 | Curtis | |
| 8,104,560 B1 * | 1/2012 | Huang | 180/165 |
| 2004/0262062 A1 * | 12/2004 | Berbari | 180/165 |
| 2005/0248321 A1 * | 11/2005 | Liu et al. | 322/4 |
| 2011/0114406 A1 * | 5/2011 | Gibson et al. | 180/165 |

FOREIGN PATENT DOCUMENTS

EP     0159445 A2   10/1985

* cited by examiner

*Primary Examiner* — David M Fenstermacher
*Assistant Examiner* — Jake Cook
(74) *Attorney, Agent, or Firm* — Jeffrey A. Thurnau, Esq.; Paul N. Dunlap, Esq.

(57) ABSTRACT

A kinetic energy recovery system for a belt driven accessory system comprising a kinetic energy storage device, a driver having a driver output, a transmission having a gear ratio connected to the driver output, a belt driven accessory system connected to the transmission through a first clutch, the kinetic energy storage device connected to the belt driven accessory system through a second clutch, and the kinetic energy storage device and the transmission connectable through the first clutch and second clutch.

10 Claims, 9 Drawing Sheets

PULLEY RATIOS

| 102 / 103 | | 203B | 203A | ENGINE TO ABDS |
|---|---|---|---|---|
| 2.5 | 2<br>304 / 301 | 0.4 | 0.50 | 1.00 |
| 2.5 | 1.2<br>305 / 302 | 0.4 | 0.50 | 0.60 |
| 2.5 | .9375<br>306 / 303 | 0.4 | 0.50 | 0.47 |
| | | | | |
| | | | | |
| | | | | ENGINE TO FLYWHEEL |
| | 2.5<br>102 / 103 | 1.2<br>305 / 302 | 8<br>202 / 201 | 24 |
| | | | | |
| | | | | FLYWHEEL TO ABDS |
| | 8<br>202 / 201 | 0.4<br>203B | 0.5<br>203A | 0.025 |

LEGEND

| |
|---|
| RATIO |
| GEAR SET<br>( _ / _ ) |

PULLEY RATIOS

|  |  |  | FLYWHEEL TO ABDS |
|---|---|---|---|
| 8 | 0.4 | 0.5 | 0.025 |
| 202 / 201 | 203B | 203A |  |

PULLEY RATIOS

|  | 102 / 103 |  | 202 / 201 | ENGINE TO FLYWHEEL |
|---|---|---|---|---|
|  | 2.5 | 2 | 8 | 40 |
|  |  | 304 / 301 |  |  |
|  | 2.5 | 1.2 | 8 | 24 |
|  |  | 305 / 302 |  |  |
|  | 2.5 | 0.9375 | 8 | 18.75 |
|  |  | 306 / 303 |  |  |
|  |  |  |  |  |

FLYWHEEL HYBRID SYSTEM

FIELD OF THE INVENTION

The invention relates to a flywheel hybrid system, and more particularly, to a flywheel hybrid system comprising a flywheel selectively clutched to an internal combustion engine accessory belt drive system.

BACKGROUND OF THE INVENTION

Flywheels are a well known means of storing energy and regulating speed. On vehicles including automobiles a large flywheel is typically mounted to the crankshaft. The flywheel inertia acts to smooth out the pulsating nature of the internal combustion process and prevents speed fluctuations from being transmitted to the transmission and the rest of the drivetrain.

Figure 1A:
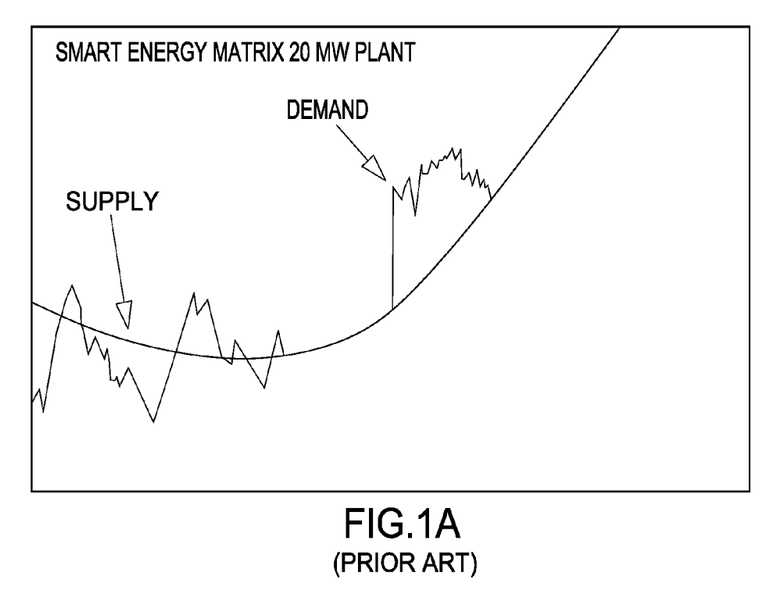
FIG. 1A is prior art showing a schematic showing regulation of a power system.

Other uses of flywheels are known as well. For example, a flywheel is used to regulate the grid frequency. When the demand for electricity is high, the generator speed slows reducing the frequency of the supplied AC power as shown in FIG. 1A. At peak demand a flywheel system could provide power, reducing the load on the generator. This keeps the speed of the generator up and maintains the frequency of the AC power. Further, flywheel based auxiliary power units (APU) can be used in power critical applications. In hospitals, if grid power is lost, a flywheel based APU can be used to provide instant power to bridge the gap between grid power loss and diesel generator start up. Similarly, critical computer systems could be kept powered up in the face of power outages.

Figure 1B:
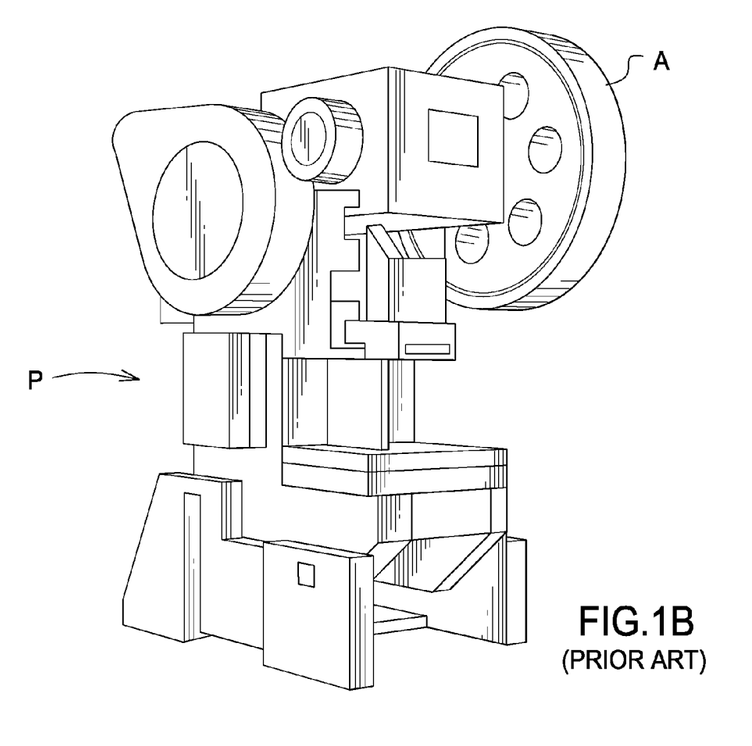
FIG. 1B is prior art showing a piece of industrial equipment using a flywheel.

FIG. 1B demonstrates the use of the flywheel in manufacturing. Machines such as presses use flywheels A to maintain a constant speed under varying loads.

Further, flywheel systems called kinetic energy recovery system (KERS) are being used in certain racing applications including open wheel racing. For example, by recovering energy what would otherwise be wasted in braking the KERS can provide an extra 80 Hp over 6.67 seconds.

Figure 2:
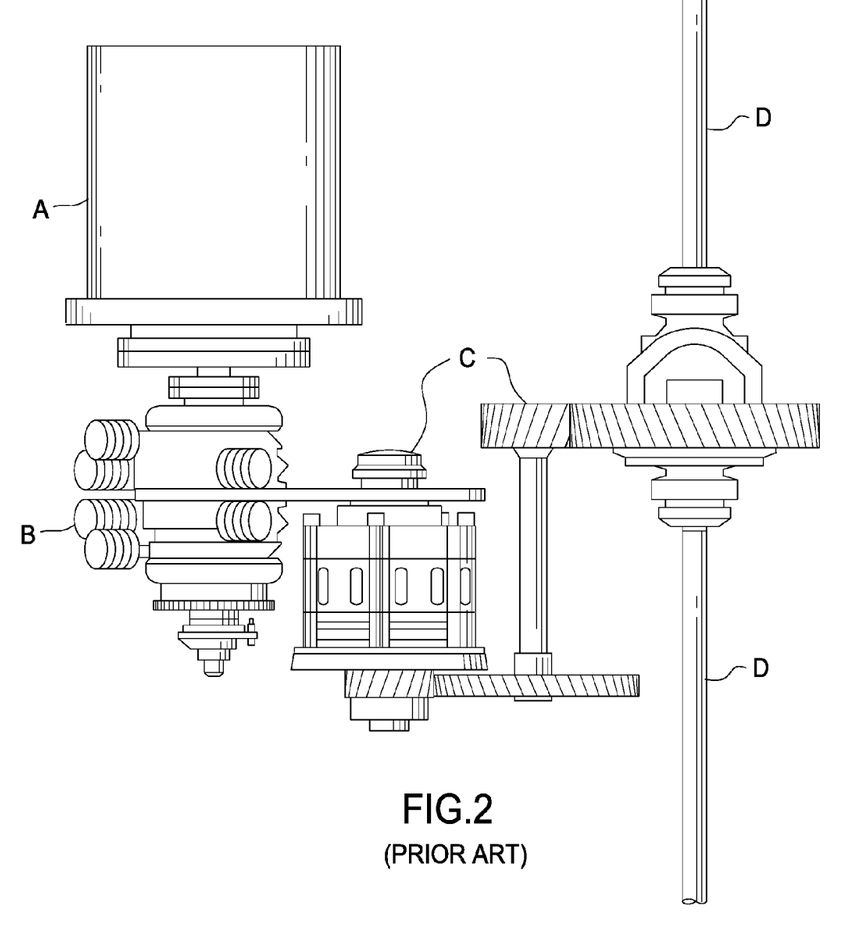
FIG. 2 is prior art showing a drivetrain KERS system.

Another known system is provided by Flybrid System, Northamptonshire, England as shown in FIG. 2. The system generally comprises a flywheel module A, a CVT module B, a gear train C, and output drive shafts D. The system provides 60 kW and can store 400 kJ of energy in the flywheel with a top speed of 60000 RPM.

Representative of the art is U.S. Pat. No. 3,672,244 which discloses an automotive system employing a high velocity, moderate mass flywheel capable of storing and rapidly dissipating large supplies of kinetic energy coupled with a transmission adapted to permit the smooth release of stored kinetic energy from the flywheel to the vehicle wheels, and a charging means for supplying kinetic energy to the flywheel at relatively low energy levels. The system provides substantial fuel economy and pollution relief through an efficient energy-conversion system.

What is needed is a flywheel hybrid system comprising a flywheel selectively clutched to an internal combustion engine accessory belt drive system. The present invention meets this need.

SUMMARY OF THE INVENTION

The primary aspect of the invention is to provide a flywheel hybrid system comprising a flywheel selectively clutched to an internal combustion engine accessory belt drive system.

Other aspects of the invention will be pointed out or made obvious by the following description of the invention and the accompanying drawings.

The invention comprises a kinetic energy recovery system for a belt driven accessory system comprising a kinetic energy storage device, a driver having a driver output, a transmission having a gear ratio connected to the driver output, a belt driven accessory system connected to the transmission through a first clutch, the kinetic energy storage device connected to the belt driven accessory system through a second clutch, and the kinetic energy storage device and the transmission connectable through the first clutch and second clutch.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

The inventive system comprises a kinetic energy recovery system (KERS) system used to drive an internal combustion engine belt driven accessory system (ABDS). The dual clutch configuration allows either the internal combustion engine or the flywheel to drive the accessories.

Significant fuel savings can be realized if the energy, otherwise wasted when the vehicle brakes are applied, is recovered and stored to be used later to propel the accessories. Usually, regenerative braking energy is used to propel the vehicle which is less efficient. In the inventive system, the recovered energy will be used to drive the engine accessories by use of a flywheel.

Figure 3A:
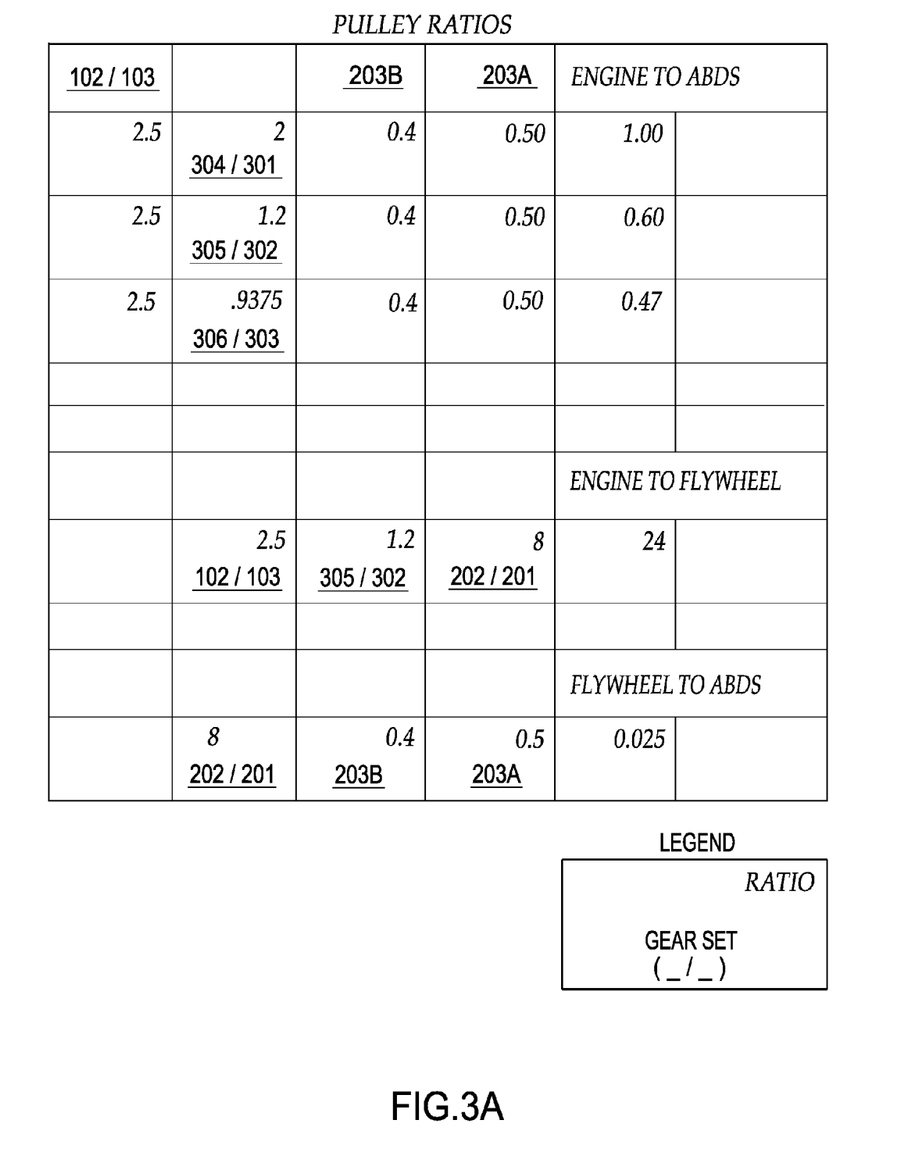
FIG. 3A is a table of pulley ratios for the system in FIG. 3B.
Figure 3B:
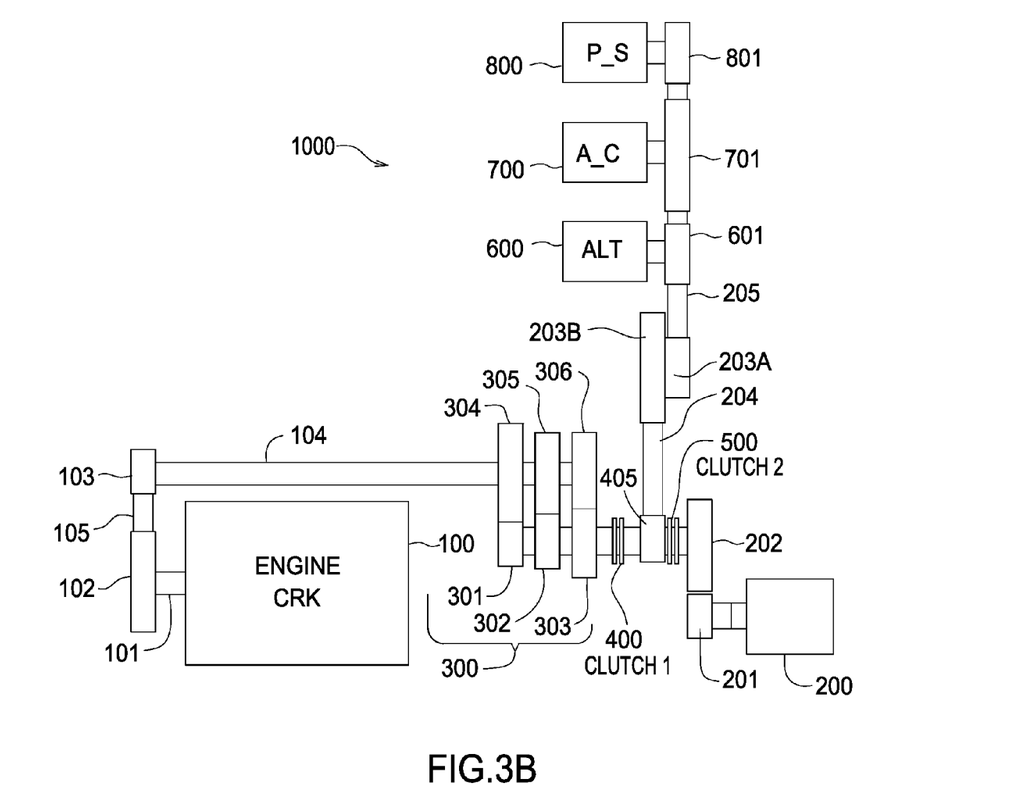
FIG. 3B is a schematic of the inventive KERS system.

The inventive KERS system for driving the engine accessories is shown in FIG. 3

The system 1000 comprises an internal combustion (IC) engine 100. Engine 100 may comprise an engine used in a vehicle such as a passenger car, truck, bus or any other vehicle using an IC engine. Engine 100 may comprise any number of cylinders as may be appropriate for the particular vehicle application in which the engine is used.

Engine 100 has an engine output 101 such as a crankshaft. A pulley 102 is attached to an end of crankshaft 101. Pulley 102 may comprise a v-belt pulley or a multi-ribbed v-belt pulley.

A belt 105 spans between pulley 102 and a pulley 103. Belt 105 may comprise either a v-belt, a multi-ribbed v-belt, chain or other suitable flexible power transmission member.

Pulley 103 is connected to shaft 104. Pulley 103 may comprise a v-belt pulley or a multi-ribbed v-belt pulley. Shaft 104 is used to redirect the output and may be included or excluded from a system depending on the configuration of the vehicle.

Shaft 104 is connected to a transmission 300. The example transmission comprises three speed ratios, namely, 2.0:1 (gears 301, 304), 1.2:1 (gears 302, 305) and 0.94:1 (gears 303, 306). Transmission 300 may comprise any known in the art suitable for use with a rotating output shaft.

Transmission 300 is connected to a first clutch 400. Clutch 400 is a friction disk type clutch.

Flywheel 200 is connected to a gear 201 and gear 202. In this embodiment the gear ratio is 8.0:1 for gear 201 and 202. Gear 202 is connected to a second clutch 500. Clutch 500 is a friction disk type clutch.

The output of clutch 400 and the output of clutch 500 are each connected to a pulley 405. Pulley 405 may comprise a v-belt pulley or a multi-ribbed v-belt pulley.

Pulley 405 is connected to pulley 203B of dual pulley 203A, 203B by a belt 204. Dual pulley 203A, 203B may comprise a v-belt pulley or a multi-ribbed v-belt pulleys. Pulley 203A and 203B are fixed together. Belt 204 may comprise either a v-belt or a multi-ribbed v-belt, or other suitable flexible power transmission member.

Accessories comprise an alternator 600, an air conditioning compressor 700 and a power steering pump 800. A pulley 601 is connected to alternator 600. A pulley 701 is connected to air conditioning compressor 700. A pulley 801 is connected to power steering pump 800. A belt 205 is trained between each pulley 601, 701 and 801 and pulley 203A. Each pulley 601, 701, 801 may comprise a v-belt pulley or a multi-ribbed v-belt pulley. However, each pulley must be compatible with the same belt type for a given system. Belt 205 may comprise either a v-belt or a multi-ribbed v-belt.

Figure 4:
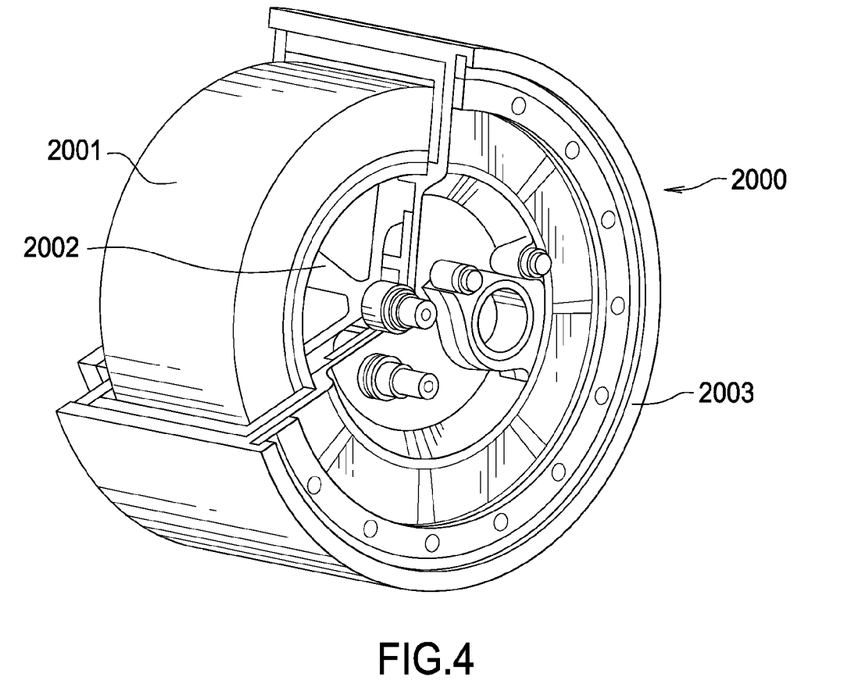
FIG. 4 is a prespective view of a flywheel.

The arrangement of the system allows the flywheel to make use of the same gearing as used for a three speed accessory drive using only a transmission 300. An example flywheel is shown in FIG. 4. In this embodiment flywheel 2000 comprises a carbon cord annulus 2001 wound over a steel hub 2002. The carbon cord annulus is contained within a case 2003 to prevent ingress of debris.

The flywheel system is connected to clutches 400, 500 through a 8.0:1.0 speed ratio transmission. For example, if the minimum speed of the engine is 800 RPM and the minimum speed of the flywheel is 32,000 RPM, then the flywheel to ABDS ratio will be $$SR_{Flywheel/ABDS} = \frac{32000}{800} = 40.0$$

At this speed ratio, the flywheel 200 must be disconnected from the engine 100 when the engine speed rises above some threshold to prevent over speeding. For example, if the speed limit of the flywheel is 60,000 RPM, then above and engine speed of $$\frac{60,000}{40} = 1500 \ RPM$$

the flywheel should be disconnected

The pulley ratios for the system are shown in FIG. 3A. The legend in FIG. 3A shows the gear ratio for the associated gear set.

Flywheel 200 used in the inventive system is shown in FIG. 4, which is relatively small and operates at above 30,000 RPM. The example flywheel is a carbon composite installed over a metal hub. The flywheel operates in a vacuum to minimize windage losses. In this embodiment the inertia of the flywheel is approximately 0.035 kg·m².

In the first mode the kinetic energy stored in the flywheel 200 is used to propel the accessories. In the second mode, the flywheel is charged by the braking energy of the vehicle. In the third mode, the engine drives the accessories while the flywheel idles.

Figure 5A:
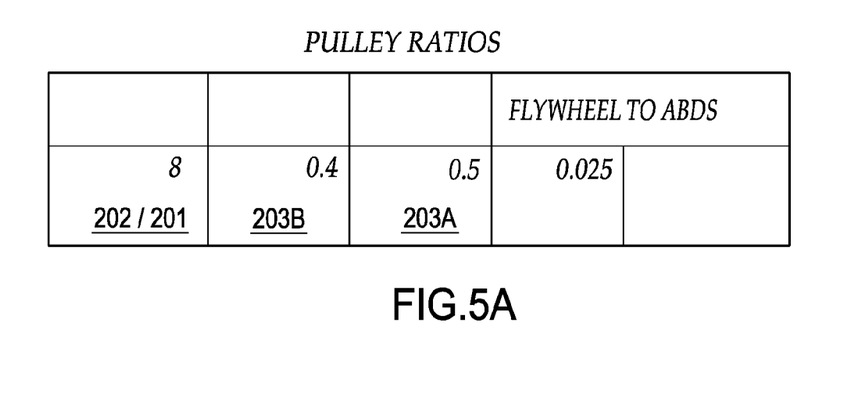
FIG. 5A is a table of pulley ratios for the system in FIG. 5B.
Figure 5B:
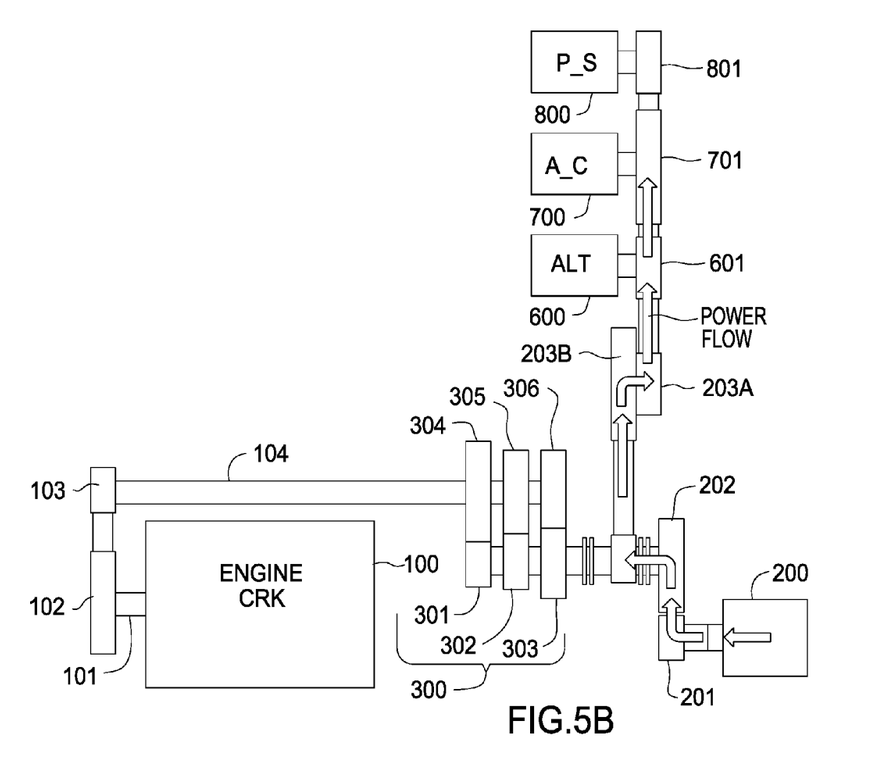
FIG. 5B is a schematic of the inventive KERS system showing flywheel drive.

As shown in FIG. 5, the accessories are connected to the high speed flywheel through a constant speed ratio of:

$$\frac{1.0}{8.0} \times 0.4 \times 0.5 = 0.025$$

By using such a large speed ratio, the speed of the accessories is kept low and the speed variations of the accessories are kept relatively small even though the flywheel speed could vary to a greater extent. This minimizes the power the flywheel has to provide and therefore provides a more efficient system.

To propel the accessories using the flywheel, clutch 400 is disengaged and clutch 500 is engaged. This configuration disconnects the accessories from the engine and utilizes power from the flywheel. The arrows in FIG. 5B show the power flow from the flywheel to the accessories.

For purposes of this example it is assumed that the flywheel is maintained at a minimum speed of 32,000 RPM. If the flywheel speed falls below this value, then clutch 400 is engaged and clutch 500 is disengaged. This reconnects the accessories to the engine and disconnects the flywheel. The accessories will then be driven by the engine through the three speed transmission 300 while the flywheel idles until a vehicle braking event occurs to recover energy and charge the flywheel.

In the noted examples, the FTP75 City Cycle is used as the basis of the system analysis. Further, a generic vehicle such as a Toyota Camry® with a 2.4 L engine is modeled with two ABDS loading conditions. The base configuration has 25 amperes electrical load, and no air conditioning. The loaded configuration has 50 amperes electrical load and an air conditioning load. The increased electrical load accounts for the AC blower motors.

Figure 6:
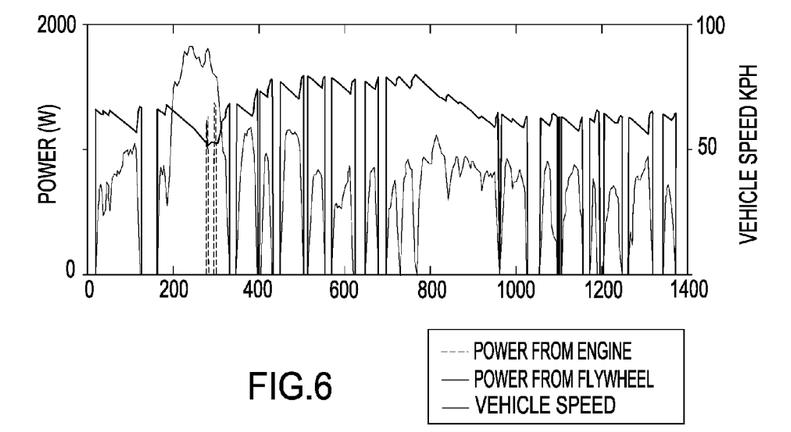
FIG. 6 is a chart showing system characteristics.

The example shown in FIG. 6 demonstrates that for the base configuration, the energy recovered from the vehicle brakes is enough to propel the accessories for the entire cycle. In the example there are only two brief instances when the flywheel reached the lower speed threshold and the engine propelled the accessories until the flywheel was charged again.

The example system is configured not to propel the accessories when the vehicle is stopped because the engine is shut off at this time. The plot shows that as the vehicle speed goes to zero, the power supplied by the flywheel and engine are zero.

Figure 7:
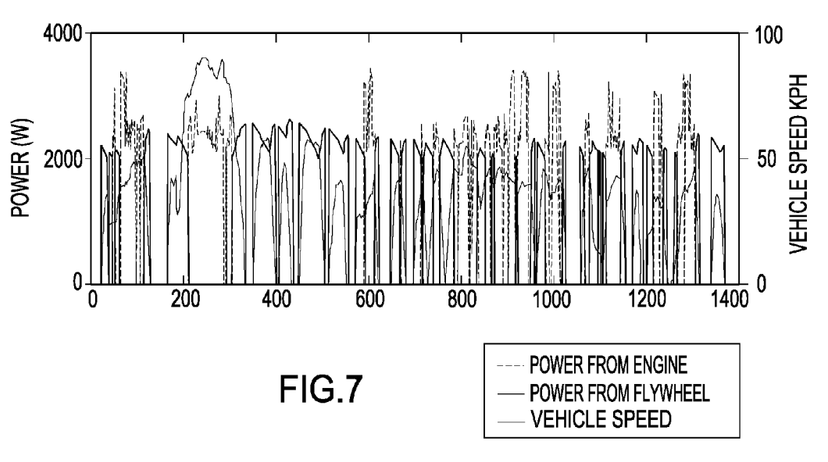
FIG. 7 is a chart showing system characteristics.

With the AC active, the ABDS requires more power than the base system with AC inactive. The excess power is supplied by the flywheel 200 and engine 100. If we assume that the accessories are suspended from operation during engine idle periods, then the plots of power to propel the accessories is shown in FIG. 7. Note the periods in which the engine now has to supply power to the accessories is greater.

When the engine is driving the accessories, it does so through the three speed accessory drive transmission 300. Whenever there is a braking event, the system charges the flywheel which provides the braking torque to the vehicle. For good drivability, a majority of the braking energy can be recovered but not all. This is because the driver has to have control over the length of time the brake is applied and with what pressure. Trying to recover all braking energy could result in an unpleasant driving experience.

Figure 8A:
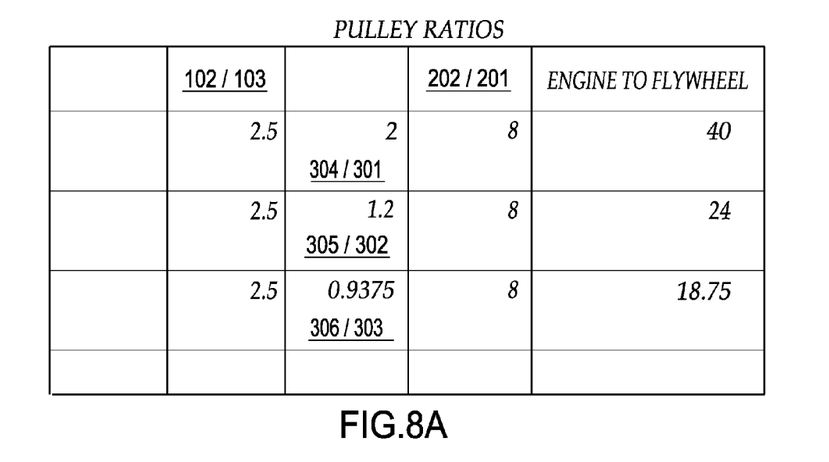
FIG. 8A is a table of pulley ratios for the system in FIG. 8B.
Figure 8B:
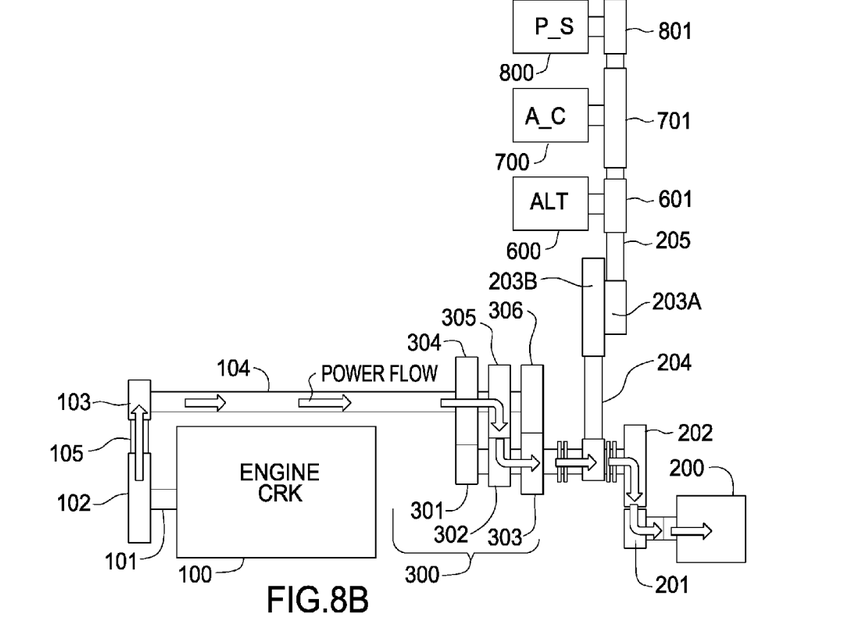
FIG. 8B is a schematic of the inventive KERS system showing flywheel recharge during a braking event.

The system configuration during a braking event is shown in FIG. 8. FIG. 8A is a table of pulley ratios for the system in FIG. 8B. During a braking event, the engine speed is decreasing and simultaneously it is desired to increase the flywheel speed. This can be achieved with the clutches and the transmission. The arrows show the power flow from the flywheel to the accessories.

Figure 9:
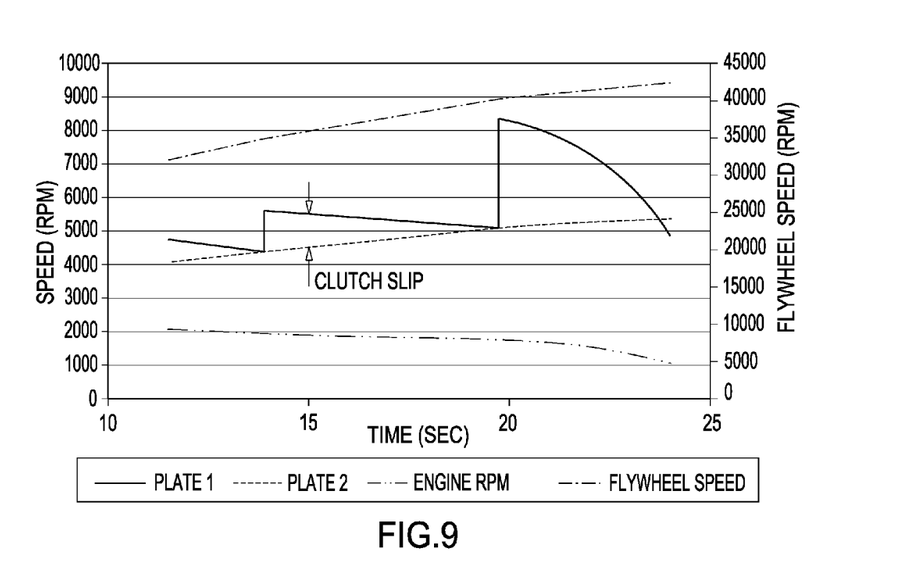
FIG. 9 is a chart showing flywheel speed characterisitcs during flywheel recharging.

During the flywheel charging process, clutch 400 and clutch 500 are engaged and power is transmitted from the engine to the flywheel and accessories through the clutches and the transmission as illustrated in FIG. 9. The actual ratio selected during the charging process will depend on the engine speed at that point.

For example, assume the engine speed is 2000 RPM and the flywheel is at 32,000 RPM when the recharging process begins. If transmission 300 having a 0.94 ratio is employed then the speed on one side of the clutch will be $$2000 \text{ RPM} \times 2.5 \times 0.94 = 4700 \text{ RPM}$$

while the speed on the flywheel side of the clutch will be $$32000 \text{ RPM} \times \frac{1}{8.0} = 4000 \text{ RPM}.$$

This results in a speed differential of 700 RPM over the clutch 400 and an effective speed ratio of $$\frac{32000}{4000} \times \frac{4000}{4700 \times} \times \frac{4700}{2000} = 16.0$$

between the engine and the flywheel. If it is assumed that the torque transferred through the clutch 400 is limited, then the speed of the flywheel 200 will increase until the speed on both sides of the clutch 400 are close to being the same and the speed ratio between the engine and the flywheel will be 18.75.

However, if the 18.75 ratio was indefinitely maintained, the speed of the flywheel will start to decrease with the speed of the engine. It is at this moment (speed decrease) that the transmission ratio is switched to 1.2 (gears 302, 305). Utilizing the second ratio will result in one side of the clutch 400 having a higher speed that the other side. Again, as torque is transferred through the clutch 400, the speed of the flywheel will increase even thought the engine speed is decreasing. When the speed on both sides of the clutch 400 is close to being the same, the final ratio of 2.0 (gears 301, 304) can be use to fully charge the flywheel.

As noted previously, for the loading condition with AC loads, it is assumed that during idle periods, the air conditioner 700 will continue to be propelled by the flywheel 200. Whenever the flywheel energy is exhausted, the engine will start up and ramp up speed until the flywheel is fully charged then turn off again. Because of this only a portion of the idle saving with AC load is realized. With no AC load it is assumed that the accessories do not operate during engine idle periods, therefore, all the engine idle savings are realized.

Figure 10A:
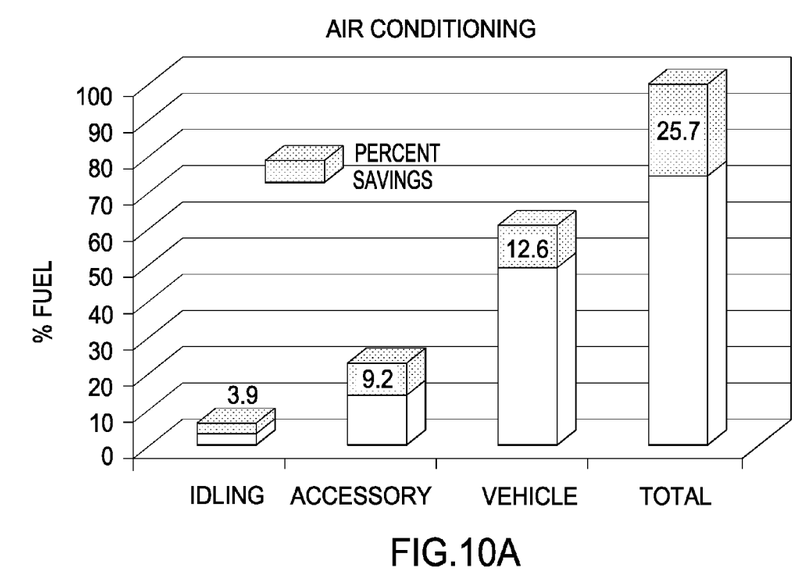
FIG. 10A is a chart showing fuel savings with air conditioning operation.
Figure 10B:
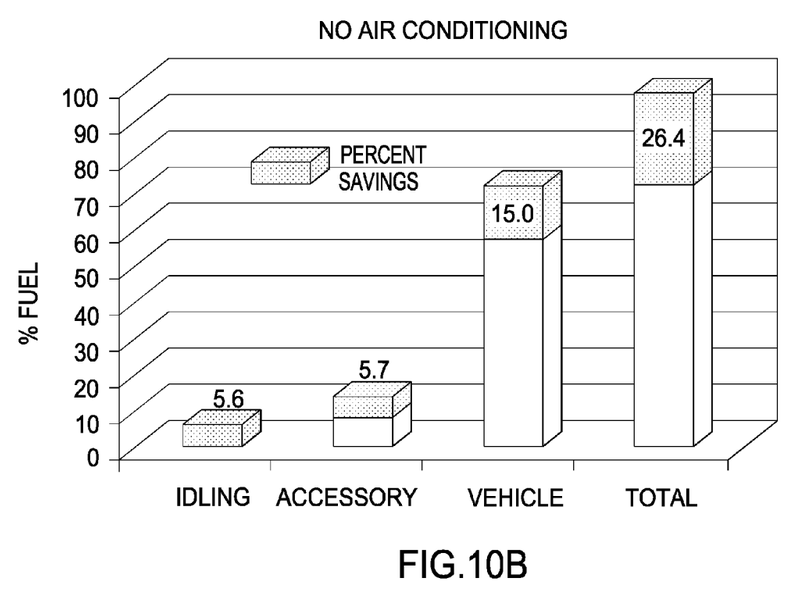
FIG. 10B is a chart showing fuel savings with no air conditioning.

FIG. 10A is a chart showing fuel savings with air conditioning operation. FIG. 10B is a chart showing fuel savings with no air conditioning.

From the inventive system a 25.7% savings is realized when the air conditioning is operating and a 26.4% savings is realized when there is no air conditioning. Although the savings are similar in value, the absolute savings in terms of volume or weight of fuel is greater with the air conditioning system since the MPG with air conditioning is lower.

The results show that the fuel savings of the inventive system are on par with the hybrid electric vehicles. The advantages of the inventive system is that in production it can be realized for perhaps a third of the cost of a full hybrid electric system according to published reports. Further advantage is realized in terms of not requiring batteries and rare earth magnets used in typical hybrid electric motors.

Although forms of the invention has been described herein, it will be obvious to those skilled in the art that variations may be made in the construction and relation of parts without departing from the spirit and scope of the invention described herein.

We claim:

1. A kinetic energy recovery system for a belt driven accessory system comprising: a kinetic energy storage device; a driver having a driver output; a transmission having a gear ratio that is connected to the driver output; a belt driven accessory system that is connected to the transmission through a first clutch; the kinetic energy storage device is connected to the belt driven accessory system through a second clutch; and the kinetic energy storage device and the transmission are connectable through the first clutch and second clutch.

2. The kinetic energy recovery system for a belt driven accessory system as in claim 1, wherein the driver comprises an internal combustion engine.

3. The kinetic energy recovery system for a belt driven accessory system as in claim 1, wherein the kinetic energy storage device comprises a flywheel.

4. The kinetic energy recovery system for a belt driven accessory system as in claim 1, wherein the accessory system comprises an alternator.

5. The kinetic energy recovery system for a belt driven accessory system as in claim 1, wherein the transmission comprises at least two gear ratios.

6. The kinetic energy recovery system for a belt driven accessory system as in claim 1 further comprising a dual ratio pulley operably disposed between the kinetic energy storage device and the accessory system.

7. The kinetic energy recovery system for a belt driven accessory system as in claim 1, wherein the kinetic energy storage device is connected to the belt driven accessory system through a belt.

8. The kinetic energy recovery system for a belt driven accessory system as in claim 1, wherein the transmission and the driver are connected through a belt.

9. A kinetic energy recovery system comprising: a kinetic energy storage device; a driver; a transmission having a gear ratio coupled to the driver through a belt; a belt driven system that is connectable to the transmission through a first clutch; the belt driven system is connectable to the kinetic energy storage device through a second clutch; and the first clutch is connectable to the second clutch.

10. A kinetic energy recovery system comprising: a driver; a belt driven engine accessory system; a transmission disposed between the driver and the belt driven engine accessory system; a kinetic energy storage device; and the belt driven engine accessory system drivable by the driver through a first clutch and a belt, and by the kinetic energy storage device through a second clutch and the belt.

* * * * *